United States Patent [19]

Lewis et al.

[11] Patent Number: 5,056,999
[45] Date of Patent: Oct. 15, 1991

[54] APPARATUS FOR FORMING OBJECTS FROM A MOLDABLE MATERIAL

[75] Inventors: Larry A. Lewis; David L. Kring, both of Whitehall; Otto F. Ernst, New Era, all of Mich.

[73] Assignee: Howmet Corporation, Greenwich, Conn.

[21] Appl. No.: 356,238

[22] Filed: May 24, 1989

Related U.S. Application Data

[63] Continuation-in-part of Ser. No. 342,898, Apr. 25, 1989.

[51] Int. Cl.$^5$ .............................................. B29C 45/80
[52] U.S. Cl. ...................................... 425/150; 100/99; 100/233; 264/297.2; 264/328.8; 425/409; 425/451.6; 425/451.9; 425/572; 425/581; 425/588; 425/589; 425/593; 425/595
[58] Field of Search ...................... 100/48.50, 99, 233; 264/297.2, 328.8; 425/150, 409, 567, 572, 581, 588, 589, 593, 595, 451.6, 451.9

[56] References Cited

U.S. PATENT DOCUMENTS

| | | | |
|---|---|---|---|
| 1,805,569 | 5/1931 | Davis | 100/233 |
| 3,523,328 | 8/1970 | Huff et al. | 425/589 |
| 3,523,343 | 8/1970 | Mitchell | 425/195 |
| 3,577,591 | 5/1971 | Ricards | 425/409 |
| 3,590,440 | 7/1971 | Cook, Jr. | 425/153 |
| 3,624,672 | 11/1971 | Spivy | 425/156 |
| 3,704,973 | 12/1972 | Renfrew et al. | 425/150 |
| 4,710,119 | 12/1987 | Otake | 425/589 |

OTHER PUBLICATIONS

Yeaple, Franklin D., "Hydraulic and Pneumatic Power and Control", 1966, pp. 237, 238.

*Primary Examiner*—Timothy Heitbrink
*Attorney, Agent, or Firm*—Finnegan, Henderson, Farabow, Garrett & Dunner

[57] ABSTRACT

An apparatus for forming objects from a moldable material such as wax. The apparatus includes upper and lower mold pieces having upper and lower mold cavity halves attached thereto. A lever arm extends from the upper mold piece and is pivotally attached to a linear actuator. The upper and lower mold pieces are pivotably connected to one another. Movement of the linear actuator results in opening and closing of the upper and lower mold cavity halves about the pivotable connection of the upper and lower mold pieces.

12 Claims, 6 Drawing Sheets

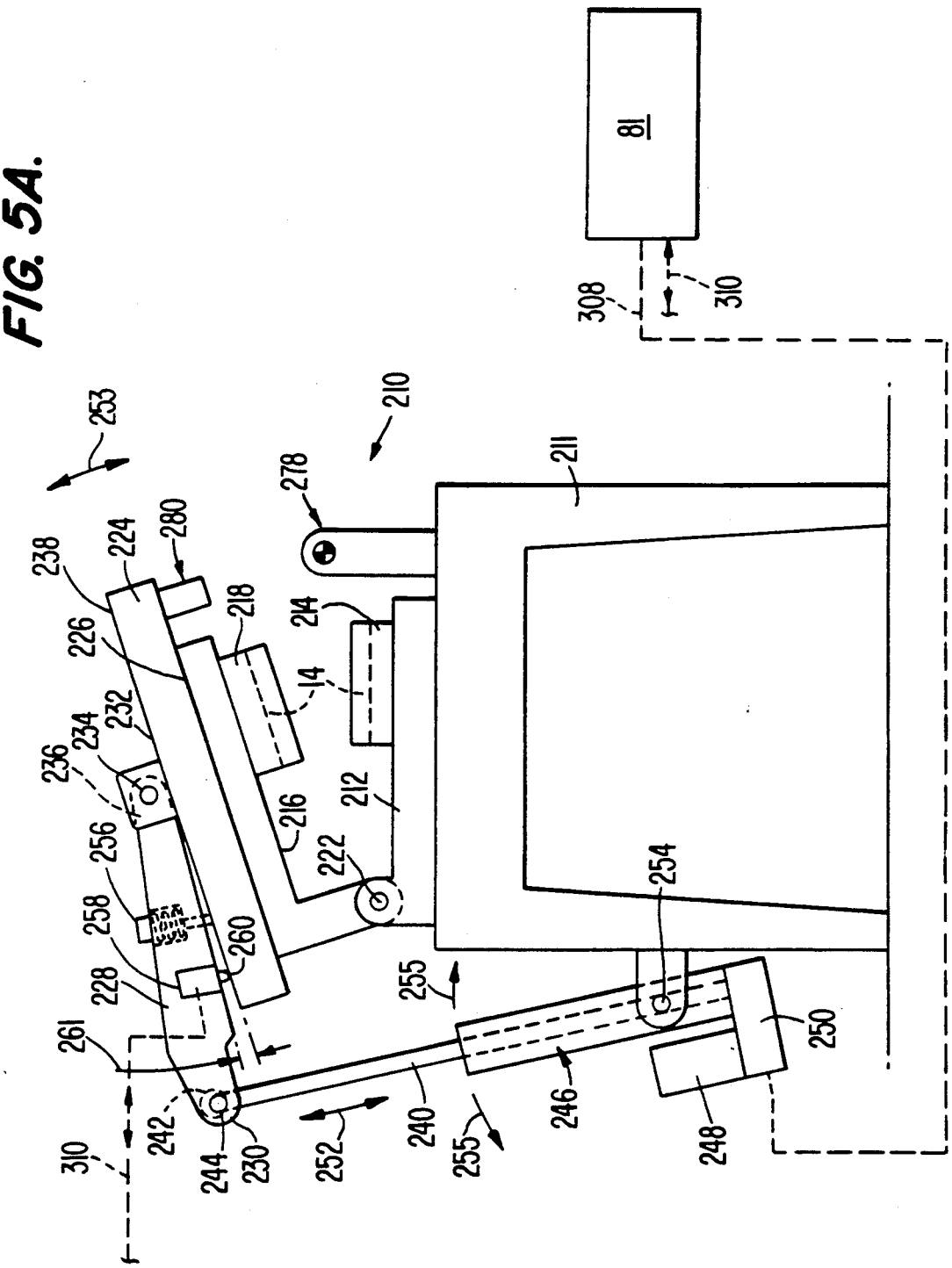

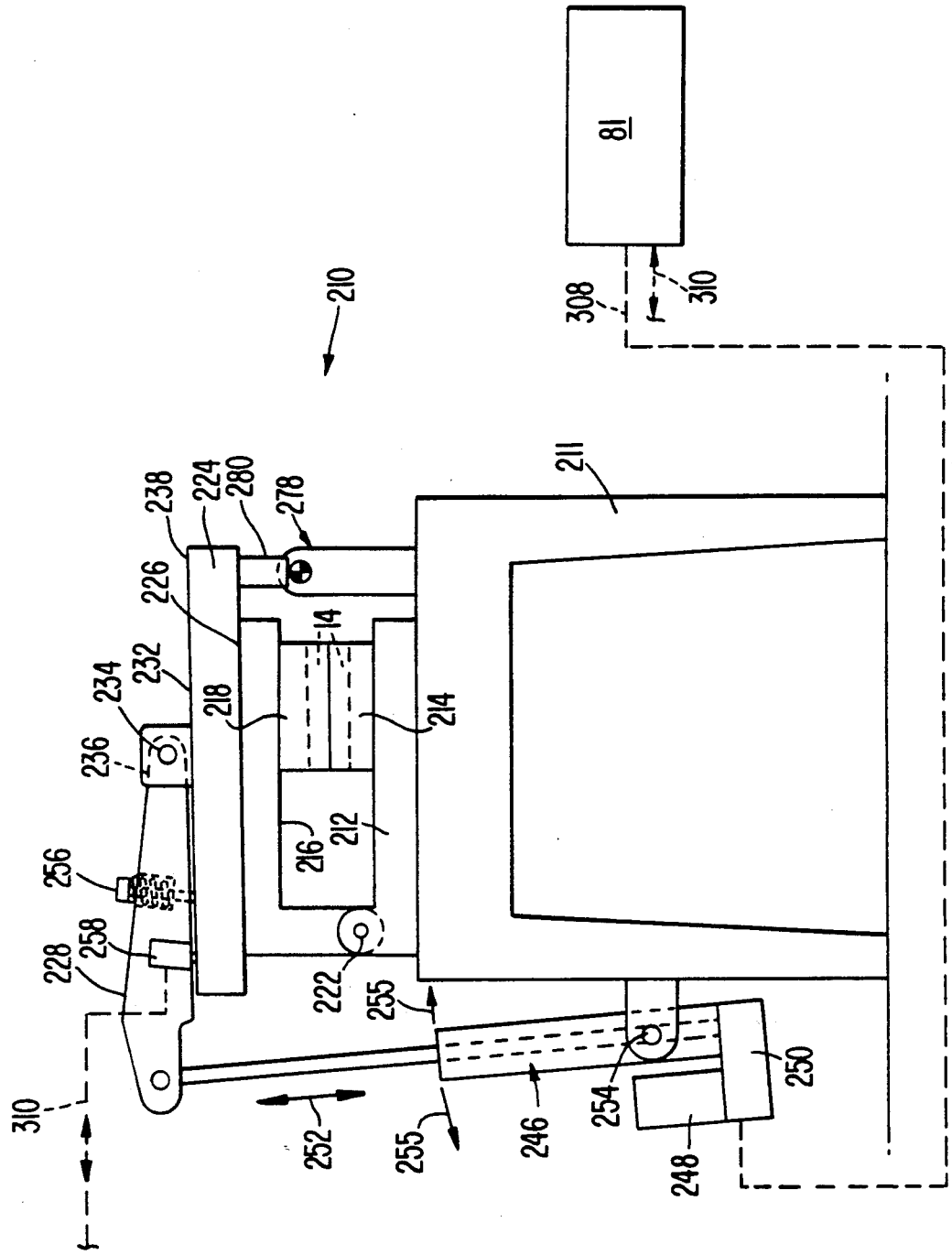

APPARATUS FOR FORMING OBJECTS FROM A MOLDABLE MATERIAL

This application is a continuation-in-part of our co-pending application Ser. No. 342,898 entitled Apparatus and Method For Controlling Injection of a Moldable Material Into A Mold Cavity, filed Apr. 25, 1989.

BACKGROUND OF THE INVENTION

1. Field of the Invention

The present invention relates generally to injection molding, and more particularly, to the configuration of an injection molding machine for forming objects from a moldable material.

2. Description of the Related Art

There are known prior art injection molding machines which inject moldable material into a tool comprised of upper and lower mold cavity halves. In some instances where permitted by the shape of the mold cavity, the upper and lower mold cavity halves are pivotably connected together at one end. The tool is movable on a work table by an operator to be placed below a vertically movable upper platen. The upper platen is moved downwardly onto the upper mold cavity half to press the upper and lower mold cavity halves together in preparation for injection of moldable material into the mold cavity. After injection of the moldable material into the mold cavity the upper platen is raised vertically to relieve the locking force on the tool. The operator then withdraws the tool from below the upper platen and pivotally opens the upper mold cavity half to retract the molded object from the cavity. Such prior art machines typically utilize an hydraulic drive mechanism for vertically moving the upper platen and for applying the locking force to the upper mold cavity half.

Other prior art injection molding machines, such as described in U.S. Pat. No. 3,523,328, include apparatus for initially vertically lifting an upper mold cavity half a predetermined distance to expose the object formed in the mold cavity, and then, in a subsequent portion of the opening cycle, the upper mold cavity half is tilted arcuately to expose the lower mold cavity half and the molded object for inspection and cleaning.

Each of the prior art injection molding machines described above have significant drawbacks. The machines which utilize a vertically moving upper platen to press the upper and lower mold cavity halves together must apply a very high force to the abutting mold cavity halves in order to hold the mold cavity halves together and resist the forces generated from high pressure injection of moldable material into the mold cavity. Such high forces may cause damage to the tool mold where foreign objects are present between the abutting surfaces of the upper and lower mold cavity halves. For intricate configurations requiring high tolerances, such as where the molded object is to be used as a pattern for turbine engine components, the cost of the tool may exceed $100,000 and, once damaged, must be replaced or repaired.

Furthermore, since an operator must physically move the tool away from the space immediately below the upper platen to have sufficient space to pivotally open the upper and lower mold cavity halves, there is a decrease in efficiency of the molding process due to the extent of operator involvement. Also, such extensive operator manipulations increases the chances of injury to the operator from exposure to the moving upper platen. Furthermore, studies have shown that long term exposure to the operator manipulations required to open and close the tool result in a significant loss of dexterity in the hands.

With machines of the type disclosed in U.S. Pat. No. 3,523,328, where the upper mold cavity is moved vertically away from the lower mold cavity just prior to removing the molded object, there is a chance of damaging the surface of the molded object particularly where those surfaces ar rounded and designed to high tolerances such as is the case for turbine engine components.

Therefore, it is an object of the present invention to provide an apparatus for forming objects from a moldable material wherein the locking force holding the upper and lower halves of the mold cavity closed during injection of moldable material into the mold cavity is significantly less than a separation force which the apparatus is capable of resisting and which tends to urge the upper and lower mold cavity halves apart. In this manner, damage to the mold caused by pressing the upper and lower cavity halves together with a high force when foreign objects are present is significantly reduced.

It is a further object of the present invention to provide an apparatus for forming objects from a moldable material which eliminates the need for an upper platen in a conventional sense thereby increasing the overall efficiency and safety of the molding process.

It is still a further object of the present invention to provide an injection molding machine which automatically opens a mold cavity by pivotally moving the upper mold cavity half in an arcuate path away from the lower mold cavity half to thereby reduce operator involvement and decrease the chances of damaging the surface of the molded object.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects, and in accordance with the purposes of the invention as embodied and broadly described herein, an apparatus for forming objects from a moldable material is provided, comprising: a lower mold piece having a lower half of a mold cavity attached thereto, and an upper mold piece having an upper half of a mold cavity attached thereto. The upper mold piece is pivotably connected to the lower mold piece at a first pivot point and a lever arm having a distal end extends from the upper mold piece. Actuator means, pivotably connected to the distal end of the lever arm at a second pivot point, is provided for pivoting the lever arm and the upper mold piece about the first pivot point to move the upper mold piece and the upper mold cavity half in an arcuate path between a closed position in which the upper and lower mold pieces and the upper and lower mold cavity halves are juxtaposed to close the mold cavity, and an open position in which the upper and lower mold cavity halves are spaced from one another to open the mold cavity.

Preferably, the apparatus includes locking and resisting means for applying a locking force to hold the upper and lower mold pieces in the closed position, and for resisting a separation force tending to urge the upper and lower mold pieces into the open position. The maximum value of the locking force being substantially less than the maximum value of the separation force which the apparatus can resist.

Preferably, the actuator means comprises a linearly movable drive rod having a distal end pivotably connected to the distal end of the lever arm at the second pivot point. The drive rod is reciprocated by any conventional means to pivot the lever arm, upper mold piece, and upper mold cavity half about the first pivot point.

In a further embodiment of the present invention the injection molding machine comprises first and second lower mold pieces having respective first and second lower mold cavity halves attached thereto, and first and second upper mold pieces having first and second upper mold cavities attached thereto. The first upper mold piece is pivotably connected to the first lower mold piece, and the second upper mold piece is pivotably connected to the second lower mold piece. Lever arms each having a distal end extend from each of the first and second upper mold pieces. First and second actuator means pivotably connected to respective ones of the first and second lever arms are provided for pivoting the lever arms and upper mold pieces about the pivotable connection of the upper and lower mold pieces to thereby selectively open and close one or the other of the first and second mold cavities.

Preferably this dual cavity injection molding machine includes means for independently controlling the first and second actuator means to selectively open and close the first and second mold cavities. In addition, means, responsive to the control means, is provided for injecting moldable material into one or the other of the first and second mold cavities.

In the preferred embodiment the injecting means comprises a piston and cylinder assembly for holding moldable material, and movable injection nozzle means selectively connecting the piston and cylinder assembly with one of first and second inlets of the first and second mold cavities. In this manner, while one mold cavity is open to permit retraction of the molded object formed in the mold cavity, the second mold cavity is closed as the moldable material is being injected into the mold cavity. Thus, the efficiency of the injection molding process is increased.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

FIGS. 5A and 5B are side views of an injection molding machine incorporating the teachings of the present invention in an open and a closed position, respectively;

DESCRIPTION OF THE PREFERRED EMBODIMENT

Reference will now be made in detail to the presently preferred embodiments of the invention as illustrated in the accompanying drawings.

Figure 1:
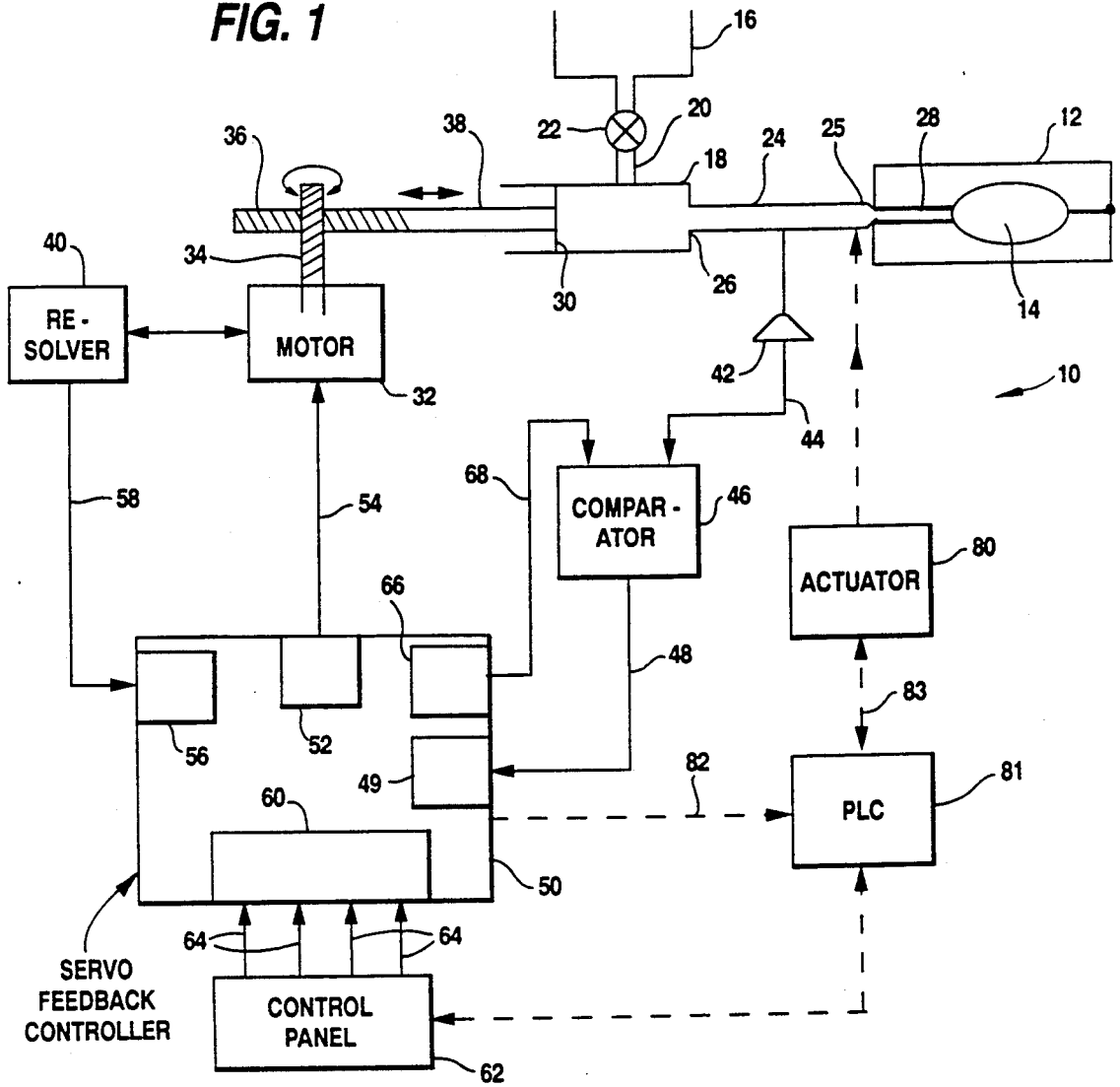
FIG. 1 is a schematic illustration of an apparatus for controlling injection of moldable material into the mold cavity.

As illustrated in FIG. 1, an apparatus generally referred to as 10 includes a die or tool 12 defining a mold cavity 14 which receives moldable material to be formed into a molded object. The molded object may be, for example, a wax pattern used subsequently in a lost wax process for casting turbine blades. Apparatus 10 further includes a reservoir 16 containing a supply of moldable material such as wax. Reservoir 16 communicates with an injection chamber 18 via a conduit 20. A control valve 22 is disposed in conduit 20. Control valve 22 functions to permit the flow of moldable material from reservoir 16 into injection chamber 18 to fill injection chamber 18 with a predetermined amount of moldable material, commonly referred to as a shot, prior to injection into mold cavity 14. During injection of the moldable material from injection chamber 18 into mold cavity 14, control valve 22 is closed to prevent the flow of moldable material back into reservoir 16 from injection chamber 18.

In the preferred embodiment illustrated in FIG. 1, injection chamber 18 comprises a cylinder having a piston 30 reciprocally disposed therein so as to be movable relative to the cylinder 18.

The apparatus of the present invention includes means for conducting the flow of moldable material from the injection chamber to the mold cavity. As embodied herein, the conducting means comprises a conduit 24 extending from an outlet 26 of injection chamber 18. At the opposite end of conduit 24 is an injection nozzle 25 which is movable into and out of engagement with an inlet 28 of tool 12. Moldable material is injected into mold cavity 14 when injection nozzle 25 is engaged with inlet 28. Injection nozzle 25 is movable into and out of engagement with inlet 28 by a conventional pneumatically or mechanically operated telescoping cylinder assembly. Alternatively, conduit 24 may be configured as a movable hollow cylinder having an inlet disposed to mate with outlet 26 when injection nozzle 25 is engaged with inlet 28.

The apparatus of the present invention includes means for displacing moldable material from the injection chamber through the conducting means into the mold cavity. As embodied herein, the displacing means comprises an electric motor 32, connected to a source of electric power (not shown), for rotatably driving a power shaft 34, and rotary to linear motion converter means comprised of a worm gear assembly 36 for converting rotary motion of the power shaft 34 into linear motion of piston 30 via a piston rod 38. The reduction ratio of worm gear assembly 36 may be chosen to optimize the mechanical load placed on motor 32 and to increase the degree of control of linear motion of piston 30. The displacing means of the present invention is not limited to worm gear assembly 36, and numerous other mechanisms known to those skilled in the art may be utilized for converting rotational motion of power shaft 34 into linear motion of piston 30.

In accordance with the present invention the apparatus includes means for monitoring at least one of: a) the rate of displacement of moldable material being conducted into the mold cavity, and b) the pressure of moldable material in the mold cavity. As embodied herein, the monitoring means includes a resolver 40 for detecting angular rotation of power shaft 34. Resolver 40 is operably connected to motor 32 to detect the position of motor 32 and, hence, the angular rotation of power shaft 34. The resolution of resolver 40 may be selected such that each 360° rotation of power shaft 34 corresponds to a predetermined number of motor positions which can be discretely detected by resolver 40 to thereby very accurately monitor the motor position and the angular rotation of power shaft 34. For purposes of describing the preferred embodiment of the present invention, reference to detection or monitoring of the angular rotation of power shaft 34 will be understood to include detecting and monitoring the motor positions of electric motor 32. However, the present invention is not limited to the disclosed apparatus embodying the monitoring means, and many other suitable alternatives for detecting angular rotation of power shaft 34 will be known to those skilled in the art.

Since rotation of power shaft 34 is directly converted into linear movement of piston 30 via piston rod 38, the position of piston 30 within the cylinder comprising injection chamber 18 may be determined by counting the number of motor positions of motor 32 from a predetermined baseline corresponding to, for example, a bottom dead center position of piston 30. Similarly, since the rate of displacement of moldable material from injection chamber 18 corresponds directly to the linear velocity of piston 30 within injection chamber 18, the rate of displacement of moldable material from injection chamber 18 may be monitored by monitoring the rotational velocity of power shaft 34 with resolver 40 knowing the reduction ratio of worm gear assembly 36. In the present preferred embodiment, electric motor 32 turns one revolution for each revolution of power shaft 34. Thus, resolver 40 is operable to monitor the number of revolutions of motor 32 and power shaft 34 from a baseline position to thereby monitor the position of piston 30 within injection chamber 18, and is further operable to monitor the rotational velocity of motor 32 and power shaft 34 and the corresponding linear velocity of piston 30 within injection chamber 18.

In accordance with the present invention and as embodied herein, the monitoring means may further include a pressure transducer 42 for monitoring the pressure of moldable material within mold cavity 14. In the preferred embodiment of the present invention illustrated in FIG. 1, pressure transducer 42 is disposed to sense the pressure of moldable material being conducted through conduit 24 from injection chamber 18 into mold cavity 14. As will be appreciated by those skilled in the art, once mold cavity 14 becomes filled with moldable material, the pressure in conduit 24 will become equal to the pressure in mold cavity 14. Pressure transducer 42 is operable to generate a voltage signal proportional to the pressure of moldable material in conduit 24, and is further operable to transmit that signal via lead lines 44 to comparator means 46. Comparator 46 in turn generates an electrical signal and transmits that signal across lead line 48 to an input terminal 49 of a feedback servo controller 50. The function of comparator 46 and feedback servo controller 50 will be described in detail hereinbelow.

In accordance with the present invention, the apparatus further includes means, responsive to the monitoring means, for controlling the displacing means to regulate the rate of displacement of moldable material into the mold cavity. As embodied herein, the controlling means comprises feedback servo controller 50. Feedback servo controller 50 includes an output terminal 52 for transmitting control signals to electric motor 32 via lead line 54. Feedback servo controller 50 includes an input terminal 56 for receiving signals generated by resolver 40 across line 58. The signals generated by resolver 40 correspond to the detected rotation of power shaft 34. Feedback servo controller 50 controls operation of motor 32 in accordance with the detected rotation of power shaft 34, or the pressure monitored by pressure transducer 42, or both.

Feedback servo controller 50 includes clock means capable of comparing the number of rotations of power shaft 34 to a time domain to thereby determine the rotational velocity of power shaft 34 and the corresponding linear velocity of piston 30. In this manner, the controlling means comprised of feedback servo controller 50 comprises means for determining the amount and rate of displacement of moldable material displaced from the injection chamber in accordance with the detected rotation of power shaft 34. Specifically, the amount of moldable material displaced from injection chamber 18 corresponds directly to the position of piston 30 relative to its baseline position in the cylinder comprising injection chamber 18. Similarly, the rate of displacement of moldable material from the cylinder comprising injection chamber 18 is directly related to the linear velocity of piston 30 as it moves within injection chamber 18.

Feedback servo controller 50 receives command signals corresponding to specific, variable injection parameters set by an operator at input terminals 60. These injection parameters may be input by an operator at control panel 62, and are transmitted across lead lines 64. By way of example and not limitation, these injection parameters may include: the shot size, i.e., the amount of moldable material to be injected from injection chamber 18 into mold cavity 14; the flow rate of moldable material displaced from injection chamber 18 via conduit 24 into mold cavity 14; the acceleration of the flow of moldable material displaced from injection chamber 18 until reaching the predetermined flow rate; the maximum pressure of moldable material in mold cavity 14; and the dwell time allotted for the pattern to cure within mold cavity 14 prior to being removed. Thus, the apparatus incorporating the teachings of the present invention is capable of controlling multiple injection parameters during each injection cycle over the entire course of the injection cycle.

By way of example and not limitation, the inventors herein have utilized a Gould Model No. 410 Intelligent Brushless Servo Positioner manufactured by Gould, Inc. as controller 50 in the preferred embodiment of the present invention. Such a feedback servo controller is capable of receiving program commands in a cyberbasic program language. In an operable embodiment of the present invention constructed by the inventors, the controller is programmed with a first subroutine that reads the commands entered on control panel 62. A second subroutine converts these set points into corresponding rotational speeds of motor 32 to affect the preset flow rate of moldable material, the preset acceleration of the flow rate of the moldable material, and the predetermined shot size. The controller might be envisioned as comprising two subassemblies. The first comprising an intelligent microprocessor which is programmed with the various subroutines noted above. The second subassembly comprises a servo positioner which controls motor 32 and power shaft 34 in accordance with specific commands from the intelligent microprocessor subassembly.

An electrical signal corresponding to the preset command pressure set point entered into feedback servo controller 50 by the operator is transmitted from an output terminal 66 across lead line 68 to comparator 46 as an analog voltage signal having a predetermined magnitude corresponding to the preset rate of displacement of moldable material. Comparator means 46 functions to compare the voltage signal generated by pressure transducer 42 to the voltage signal generated by feedback servo controller 50. When the difference in the two voltage signals is at a maximum, that is, when pressure transducer 42 is generating zero voltage corresponding to zero gage pressure in conduit 24, that voltage difference is transmitted to input terminal 49 of feedback servo controller 50 via lead line 48. That maximum voltage difference signal causes feedback servo controller 50 to operate electric motor 32 and power shaft 34 at a rotational velocity corresponding to the preset maximum rate of displacement of moldable material.

As the pressure sensed by pressure transducer 42 increases, the difference between the voltage output of pressure transducer 42 and the voltage output signal from output terminal 68 of controller 50 decreases as determined in comparator 46. Thus, the output voltage signal from comparator 46 decreases. Feedback servo controller 50 is responsive to the decreased voltage output signal of comparator 46 to decrease, proportionally, the rotational speed of motor 32 and power shaft 34 thus decreasing the rate of displacement of moldable material from injection chamber 18. Ultimately, when the predetermined command pressure of moldable material is reached, the voltage output of pressure transducer 42 matches the output voltage command signal of feedback servo controller 50, and the voltage difference generated by comparator 46 is zero. At that time, feedback servo controller 50 stops rotation of motor 32 and power shaft 34 to stop displacement of moldable material from injection chamber 18.

Preferably, during an injection cycle, servo feedback controller 50 is programmed to control the displacing means during a first portion of the injection cycle in accordance with the monitored rate of displacement of moldable material from injection chamber 18. Feedback servo controller 50 is also programmed to subsequently control the displacing means during a second portion of the injection cycle in response to the monitored pressure of moldable material in conduit 24 as described above. It is further preferable that the first portion of the injection cycle coincides with an initial portion of that cycle, and that the second portion of the injection cycle corresponds to a subsequent portion of the injection cycle.

In the preferred embodiment of the present invention this switchover from control of the injection of moldable material during the first portion of the injection cycle to control of the injection of moldable material over the second portion of the injection cycle is programmed to occur when approximately 50% of the preset shot size has been displaced from injection chamber 18 into mold cavity 14. The parameters by which injection of moldable material is controlled during an injection cycle does not limit the present invention. For instance, the injection of moldable material from injection chamber 18 into mold cavity 14 may be controlled based solely on the rate of displacement and amount of moldable material displaced from injection chamber 18 without controlling the injection cycle over any portion thereof in accordance with the monitored pressure.

In the preferred embodiment of the present invention disclosed herein, servo feedback controller 50 also comprises a dwell means, responsive to the monitored pressure, for controlling the displacing means during cure of the material in the mold cavity after it is initially filled. Typically, as the material residing in mold cavity 14 cures, it tends to contract thus reducing the pressure in mold cavity 14. As the pressure in mold cavity 14 begins to subside during this cure, feedback servo controller 50 is operable to control motor 32 to turn power shaft 34 thus creeping piston 30 forward in injection chamber 18 to add additional moldable material to mold cavity 14 to maintain the pressure of the moldable material within mold cavity 14. Feedback servo controller 50 may be programmed to be responsive to the voltage difference signal generated by comparator 46 to achieve the function of the dwell routine. Moreover, in the event of overshoot of moldable material into cavity 14, and a corresponding increase in pressure of moldable material in cavity 14 above the preset pressure command set point, comparator 46 will generate a voltage of reversed polarity and feedback servo controller 50 may be programmed to control motor 32 to rotate power shaft 34 in the opposite direction to relieve the amount of pressure overshoot in cavity 14.

In the preferred embodiment of the present invention, apparatus 10 further includes means for moving injection nozzle 25 into and out of engagement with inlet 28 of tool 12. As embodied herein the moving means comprises a pneumatically or electrically driven actuator represented schematically in FIG. 1 as 80. Actuator 80 is controlled by a programmable logic controller (PLC) 81 which functions, at least in part, as a relay for receiving signals from servo feedback controller 50 and for transmitting signals to actuator 80. For instance, after the correct shot size of moldable material has been drawn into the injection chamber, servo feedback controller 50 generates a signal which is transmitted across lead line 82 to PLC 81. PLC 81, in response, relays a signal to actuator 80 across lead line 83 to extend nozzle 25 into engagement with inlet 28 of tool 12. PLC 81 may also receive and transmit signals to and from control panel 62. Such signals may be representative of the status of the molding operation and may be displayed on control panel 62 for observation and tracking by the operator.

Figure 2:
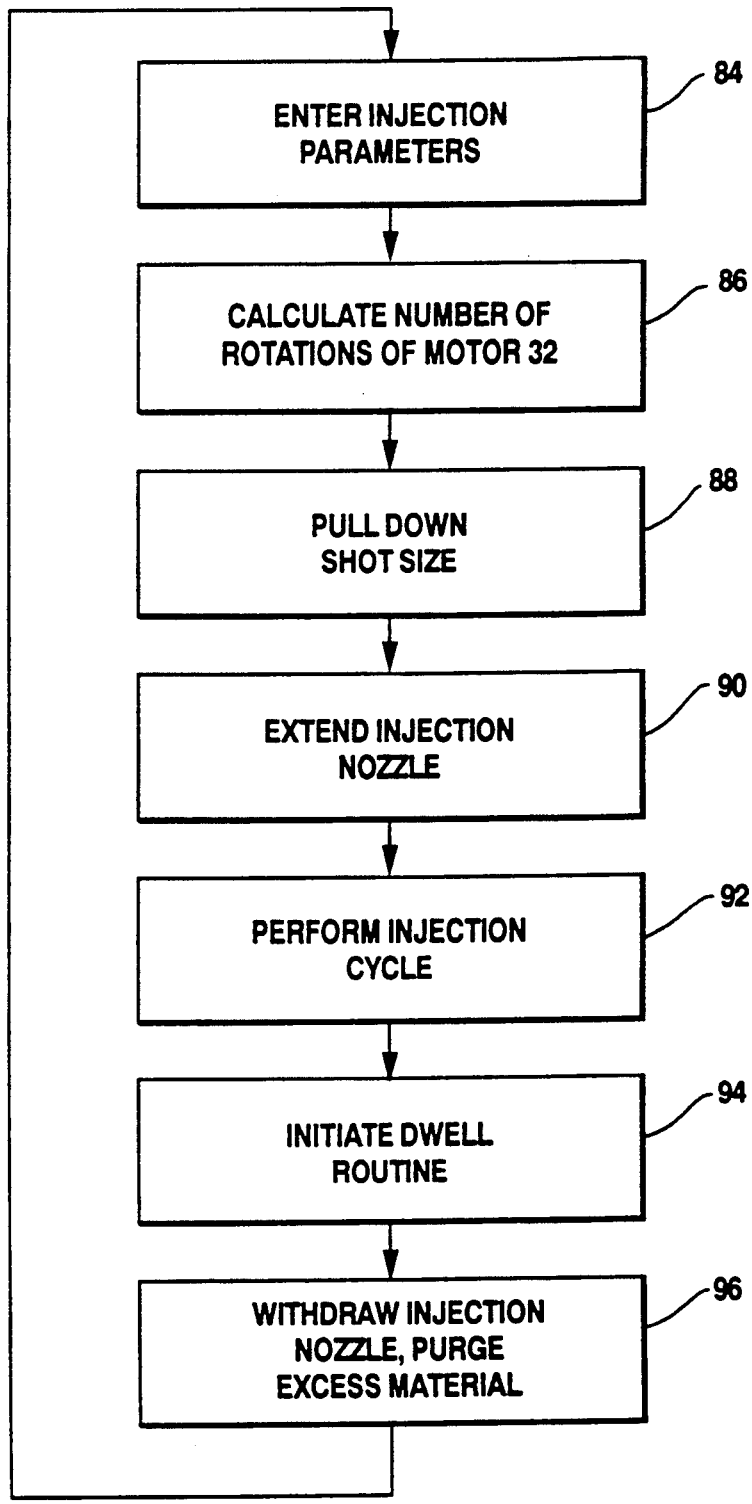
FIG. 2 is a flowchart of the programmed logic of a feedback servo controller shown in FIG. 1.

FIG. 2 presents a flowchart of the programmed logic of feedback servo controller 50 in the preferred embodiment of the present invention. At step 84, command signals corresponding to the preset injection parameters are input into controller 50. At step 86, the microprocessor subassembly of feedback servo controller 50 calculates the number of revolutions of motor 32 and power shaft 34 necessary to inject the preset shot size, and the rotational speed of motor 32 and power shaft 34 necessary to achieve the preset rate of displacement and acceleration of moldable material.

At step 88, feedback servo controller 50 opens control valve 22 and actuates motor 32 to withdraw piston 30 away from outlet 26 and pull the preset shot size of moldable material from reservoir 16 into injection chamber 18. At step 90, servo feedback controller 50 signals actuator 80 to extend injection nozzle 25 into engagement with inlet 28. At step 92, the servo positioner subassembly of feedback servo controller 50 performs the injection cycle in accordance with the preset injection parameters. During the first portion of the injection cycle the displacement of moldable material is controlled solely in accordance with the preset acceleration and rate of displacement commands. During the second portion of the injection cycle the displacement of moldable material is also controlled in accordance with the pressure signals generated by pressure transducer 42.

At step 94, feedback servo controller 50 initiates the dwell routine upon receiving a signal from comparator 46 which corresponds to the preset command pressure set point being reached in mold cavity 14. The dwell routine may also be initiated by feedback servo controller 50 after the preset shot size of moldable material has been displaced from injection chamber 18.

At step 96, after completion of the dwell routine, feedback servo controller 50 signals actuator 60 to withdraw injection nozzle 25 from inlet 28 and any excess moldable material may be purged to prime the apparatus for the next injection cycle.

Figure 3:
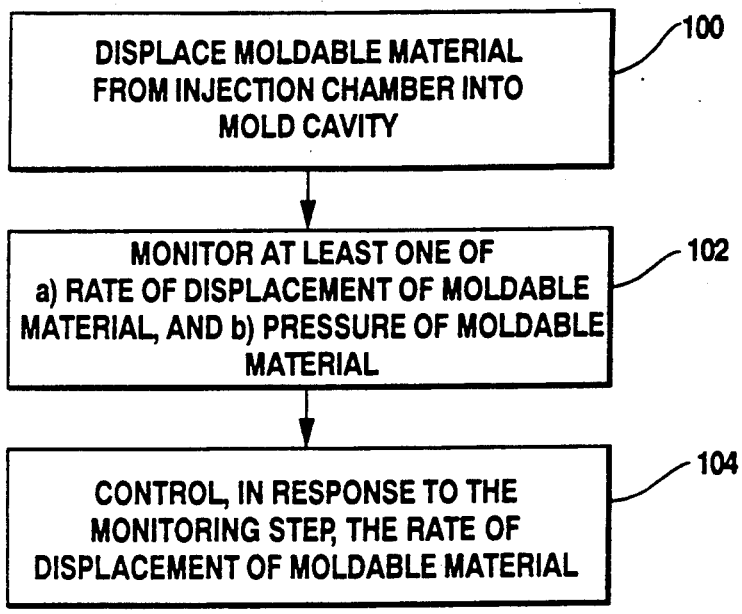
FIG. 3 is a flowchart illustrating the steps of the method of the present invention for controlling injection of moldable material.

With reference to FIG. 3 there is illustrated the steps of the method of the present invention for molding an object in an enclosed mold cavity having an inlet for receiving moldable material from an outlet of an injection chamber. At step 100 the moldable material from the injection chamber is displaced into the mold cavity. At step 102 at least one of the rate of displacement of the moldable material from the injection chamber and the pressure of the moldable material in the mold cavity is monitored. At step 104 the displacement of the moldable material from the injection chamber is controlled in response to the monitoring step to regulate the flow of the moldable material into the mold cavity.

Preferably, the displacing step includes the step of displacing moldable material from the injection chamber with a motor driven mechanical actuator. In the preferred embodiment of the present invention the motor driven mechanical actuator comprises electric motor 32 driving power shaft 34 which is operably connected to piston 30 via worm gear assembly 36 and piston rod 38.

It is further preferable that the monitoring step includes the substep of detecting the rotation of the power shaft and the controlling step includes the substep of determining the amount and rate of displacement of moldable material displaced from the injection chamber in accordance with the detected rotation of the power shaft.

The high degree of control of the various injection parameters which is achievable with the apparatus and method of the present invention as described above lends itself to a new and useful diagnostic method of determining the sequential displacement of moldable material into the mold cavity to thereby determine the sequence and nature of the flow pattern in which portions of the mold cavity are filled with moldable material. Such a diagnostic method provides a very important tool for analyzing defects in molded objects. By way of example, in instances where the moldable material is injected into the mold cavity around a ceramic core which defines, for instance, cooling air flow passages in the molded object, it is not uncommon that cracking, breaking, or distortion of the ceramic core results from stresses applied to the ceramic core by the flow of moldable material into the mold cavity.

Utilizing results of the analysis of the diagnostic method of the present invention described hereinbelow, it may be possible to solve such problems by relocating the position of inlet 28 relative to the mold cavity 14 or changing the manner in which air is vented from the mold cavity as it fills with moldable material to relieve stress concentrations on the ceramic core caused by the flow of moldable material into the mold cavity. Furthermore, the results of the analysis using the diagnostic method of the present invention may result in a determination that the ceramic core needs to be supported within the mold cavity to thereby offset any stresses developed by the flow of moldable material into the mold cavity and around the ceramic core. Furthermore, the results of the analysis of the diagnostic method of the present invention may result in a determination that the rate of displacement of moldable material into the mold cavity might be varied to change the flow pattern of the moldable material around a ceramic core disposed in the mold cavity. Numerous other advantages of the diagnostic method of the present invention will be readily appreciated by those skilled in the art.

Figure 4:
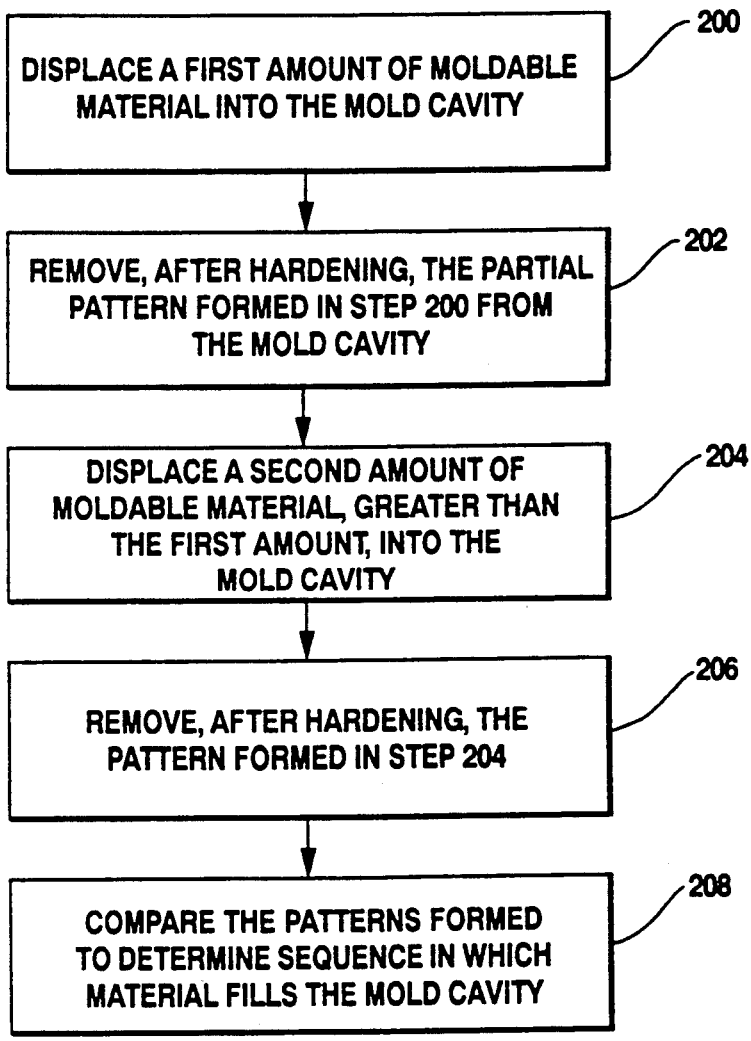
FIG. 4 is a flowchart illustrating the steps of the diagnostic method for analyzing defects in the molded object.

With reference to FIG. 4, the steps of this diagnostic method are illustrated in a flowchart. At step 200 a first predetermined amount of moldable material is displaced into the mold cavity. The first predetermined amount of moldable material being less than the volume of the mold cavity. At step 202 the partial pattern formed in step 200 is removed from the mold cavity after hardening. At step 204 a second predetermined amount of moldable material is injected into the empty mold cavity, the second predetermined amount of moldable material being an incrementally larger volume of moldable material than the first predetermined amount. At step 206 the pattern formed in step 204 is removed from the mold cavity after hardening. At step 208 the patterns formed by each sequential displacement of material into the mold cavity are compared to determine the sequence in which portions of the mold cavity are filled with moldable material.

Should defects have occurred in the molded pattern, an analysis of the manner in which the mold cavity is filled may result in various changes as previously described to eliminate the defects.

FIGS. 5A and 5B are detailed side views of an injection molding apparatus or machine 210 incorporating the teachings of the present invention in an open and a closed position, respectively. Apparatus 210 includes a lower mold piece 212 having a lower mold cavity half 214 attached thereto. Lower mold piece 212 is in turn mounted on a table or platform 211 by any convenient means such as bolted connections. Apparatus 210 further includes an upper mold piece 216 having an upper mold cavity half 218 attached thereto.

Upper mold piece 216 is pivotably connected to lower mold piece 212 at a first pivot point 222. By way of example and not limitation, the pivotable connection of upper mold piece 216 and lower mold piece 212 at first pivot point 222 may be formed by a pin extending through aligned apertures in the upper and lower mold pieces. However, any known means for making the pivotable connection between the upper and lower mold pieces may be utilized.

In the preferred embodiment of the present invention an upper plate 224 is fixedly attached to an upper surface 226 of upper mold piece 216 by any conventional means, such as bolting. For purposes of describing the preferred embodiment of the present invention, upper plate 224 is considered to comprise a part of upper mold piece 216.

A lever arm 228 having a distal end 230 extends from upper plate 224. Lever arm 228 includes a proximal end 232 which is pivotably connected at a third pivot point 234 to brackets 236 which extend from an upper surface 238 of upper plate 224. Here again, the pivotal connection of lever arm 228 to upper plate 224 at third pivot point 234 may comprise a connecting pin which extends through aligned apertures in brackets 236 and proximal end 232 of lever arm 228. However, any other conventional pivotable connection may be used.

In accordance with the present invention apparatus 210 includes actuator means, pivotably connected to the distal end of the lever arm at a second pivot point, for pivoting the lever arm and the upper mold piece about the first pivot point to move the upper mold piece and the upper mold cavity half in an arcuate path between a closed position, in which the upper and lower mold pieces and the upper and lower mold cavity halves are juxtaposed to close the mold cavity, and an open position in which the upper and lower mold cavity halves are spaced from one another to open the mold cavity. As embodied herein, the actuator means comprises a drive rod 240 having a distal end 242 which is pivotably connected to distal end 230 of lever arm 228 at second pivot point 244. The pivotable connection of distal end 230 of lever arm 228 to distal end 242 of drive rod 240 may comprise a connecting pin extending through aligned apertures in the distal ends of the lever arm and drive rod. However, any other conventional pivotable connection may be used.

The actuator means further includes means for reciprocating the drive rod to pivot the lever arm, upper mold piece, and upper mold cavity half about the first pivot point. As embodied herein, the reciprocating means comprises a linear actuator 246 which is driven by an electric motor 248 operably connected to drive rod 240 via a gear box 250. FIGS. 5A and 5B illustrate upper plate 224, upper mold piece 216, and upper mold cavity half 218 in two different positions as those elements are pivoted about first pivot point 222.

By way of example and not limitation, an Electrak ™ Linear Actuator System manufactured by Warner Electric, a subsidiary Dana Corporation, may be utilized as linear actuator 246 in the present invention.

As drive rod 240 is reciprocated along the direction of arrows 252 by linear actuator 246, lever arm 228, upper plate 224, upper mold piece 216, and upper mold cavity half 218 are pivoted about first pivot point 222 in an arcuate path represented by bi-directional arrow 253. In the illustration of FIG. 5A, upper mold cavity half 218 is shown as partially separated from lower mold cavity half 214.

Preferably, linear actuator 246 and drive rod 240 are mounted for pivotable movement to table 211 about a fourth pivot point 254 in the directions represented by arrows 255. In this manner, drive rod 240 and linear actuator 246 are movable to accommodate the arcuate path through which lever arm 228 is moved by reciprocation of drive rod 240.

With continued reference to FIGS. 5A and 5B, the present invention further includes spring means for biasing the lever arm and the upper mold piece toward one another about the third pivot point. As embodied herein, the spring means comprises a high compression spring pack 256 disposed in lever arm 228 and fixedly connected at one end to upper plate 224. Spring pack 256 acts to bias lever arm 228 toward upper surface 238 of upper plate 224 about third pivot point 234.

The present invention further includes switch means, disposed between the lever arm and the upper mold piece, for detecting a predetermined amount of angular movement of the lever arm about the third pivot point. As embodied herein, the limit switch means comprises a switch 258 having a spring biased button 260 which in its normal state is compressed by being in contact with upper surface 238 of upper plate 224. The function of limit switch 258 is to detect overtravel of drive rod 240 when the upper and lower mold pieces are moved to their closed position. Once upper mold cavity half 218 contacts lower mold cavity half 214 any further travel of drive rod 240 will be against the bias of spring pack 256 and will act to lift lever arm 228 away from upper surface 238 of upper plate 224 about third pivot point 234. Such overtravel of drive rod 240 creates angular motion of lever arm 228 as indicated by arrow 261. The predetermined amount of angular movement of lever arm 228 about third pivot point 234 causes spring bias button 260 of limit switch 258 to come out of contact with upper surface 238 of upper plate 224 thereby generating a signal corresponding to overtravel of drive rod 240.

In the preferred embodiment of the present invention, the signal generated by the limit switch means upon detection of overtravel of drive rod 240 is transmitted across a lead line 310 to PLC 81. PLC 81 is programmed to control operation of motor 248 of linear actuator 246 in accordance with various predetermined signals one of which is the signal generated by the limit switch means. PLC 81 is operably connected to motor 248 via lead line 308 and is capable of initiating and stopping operation of motor 248 by transmitting signals across lead line 308. Upon sensing the overtravel signal generated by limit switch 258 PLC 81 stops operation of motor 248.

Figure 6:
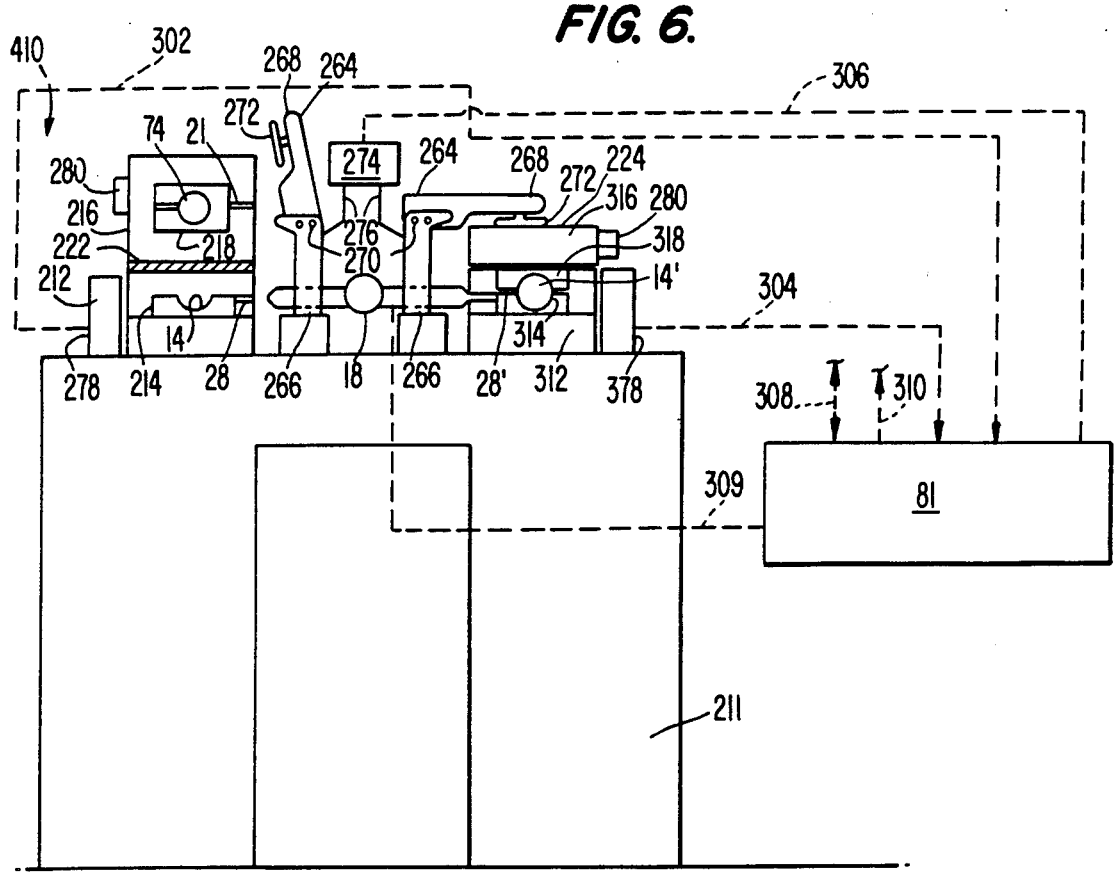
FIG. 6 is a front view of the injection molding machine of FIG. 1.

With reference to FIG. 6, a second embodiment of the injection molding apparatus of the present invention is shown and referred to generally as 410. Apparatus 410 is a dual cavity machine having first and second mold cavities 14 and 14'. Second mold cavity 14' is defined by second upper and lower mold cavity halves 318 and 314 attached to respective second upper and lower mold pieces 316 and 312. Second upper and lower mold pieces 316 and 312 are substantially identical to upper and lower mold pieces 216 and 212, and are moved between the open and closed positions by a second actuator means (not shown) connected to a second lever arm (not shown) which are identical in construction and operation to the actuator means and lever arm previously described and illustrated in FIGS. 5A and 5B. Upper and lower mold pieces 316 and 312 are shown juxtaposed and in the closed position to close second mold cavity 14'.

With continued reference to FIG. 6 and in accordance with the present invention, locking and resisting means are provided for applying a locking force to hold the upper and lower mold pieces closed, and for resisting a separation force tending to urge the upper and lower mold pieces open, the maximum value of the locking force being substantially less than the maximum value of the separation force. As embodied herein, the locking and resisting means comprises at least one toggle clamp 264 disposed adjacent to each mold cavity 14 and 14'. Since locking and resisting means for each mold cavity are identical, only one will be described herein.

Toggle clamp 264 is pivotable between a first position in which the toggle clamp locks the upper and lower mold pieces together to close the mold cavity, and a second position in which the toggle clamp is retracted and the upper and lower mold pieces may be pivoted about first pivot point 222 to open mold cavity 14. Any desired number of toggle clamps 264 may be used and the spacing between each clamp is determined so as to evenly distribute the locking and resisting forces along the upper mold piece.

As illustrated in FIG. 6, one toggle clamp 264 is shown in the locked or first position to lock upper and lower mold pieces 316 and 312 together to define mold cavity 14'. The other toggle clamp is shown in the retracted or second position to permit upper mold piece 216 and upper mold cavity half 218 to be separated from lower mold cavity half 214 expose mold cavity 14. Each toggle clamp 264 includes a stationary portion 266 which is securely fixed to table 211, and a pivot arm 268 which pivots relative to stationary portion 266 about pivot pins 270. Extending from each pivot arm 268 is a holding piece 272 which is disposed to clamp down onto upper plate 224 of upper mold piece 316 when upper mold piece 316 and lower mold piece 312 are in the closed position.

Toggle clamp 264 is preferably pneumatically actuated through a source of pressurized air 274 which injects compressed air via conduits 276 into interior piston and cylinder assemblies (not shown) of toggle clamp 264. By way of example and not limitation the inventors herein have utilized a 2500 Series power clamp manufactured by BTM Corporation, Marysville, Mich. as toggle clamps 264 in an operable embodiment of an injection molding machine incorporating the teachings of the present invention. These toggle clamps are characterized by having in-series pneumatic cylinders disposed within pivot arms 268. The in-series pneumatic cylinders are capable of resisting a separation force of several thousand pounds which tends to urge pivot arm 268 upward into a retracted position as shown in FIG. 6. Simultaneously toggle clamp 264 applies a locking force tending to urge upper mold piece 216 toward lower mold piece 212 which locking force is only on the order of a few hundred pounds. In this manner, in instances where foreign objects may come to rest on the mating surfaces of upper and lower mold cavity halves 218 and 214, the locking force applied by clamps 264 is not sufficient to cause damage to the mold tool. However, toggle clamp 264, by virtue of its ability to resist a separation force of several thousand pounds, permits injection of moldable material into mold cavities 14 and 14' under very high pressure without the upper and lower mold cavity halves being separated during the injection process.

In accordance with the present invention the injection molding machine incorporating the teachings of the present invention includes a proximity switch means for detecting when the upper and lower mold pieces are juxtaposed and the mold cavity is closed. As embodied herein, the proximity switch means includes a proximity switch 278 disposed adjacent lower mold piece 212 on table 211. A second proximity switch 378 is disposed adjacent mold cavity 14'. The proximity switches 278 and 378 are identical in construction therefore only one is described. The proximity switch means further includes a target 280 which extends downward from upper plate 224 of upper mold piece 216. Target 280 is positioned such that when upper mold piece 216 and lower mold piece 212 are juxtaposed to close mold cavity 14, target 280 activates proximity switch 278 to generate a signal corresponding to the closed position of the mold cavity.

PLC 81 receives the signal generated by proximity switch 278 across lead line 302. In response to the signal from proximity switch 278 PLC 81 generates a signal and transmits the signal across lead line 306 to pneumatic actuator 274 which acts to inject compressed air into the cylinders residing in pivot arm 268 to move pivot arm 268 to the second or closed position to lock upper mold piece 216 closed. PLC 81 also receives a signal via lead line 304 from proximity switch 378 to indicate when mold cavity 14' is closed, and is operable to actuate the toggle clamps disposed to lock mold cavity 14' closed.

In accordance with the present invention apparatus 210 further includes means, responsive to the control means, for selectively injecting moldable material into first and second mold cavities 14 and 14'. As embodied herein, the injecting means comprises injection chamber 18, illustrated in front view in FIG. 6, in detail top view in FIG. 7 and schematically in FIG. 1. Movable piston 30 is disposed to be reciprocated within injection chamber 18 by the drive assembly and servo feedback controller previously described with reference to FIGS. 1-4. The injecting means further includes movable injection nozzle means for selectively connecting injection chamber 18 with respective first and second inlets 28 and 28' of the first and second mold cavities 14 and 14'. As embodied herein, the injection nozzle means comprises a nozzle 295 having a first inlet 296 which communicates with a first outlet 297 via a conduit 298, and a second inlet 299 which communicates with a second outlet 285 via a second conduit 286.

Figure 7:
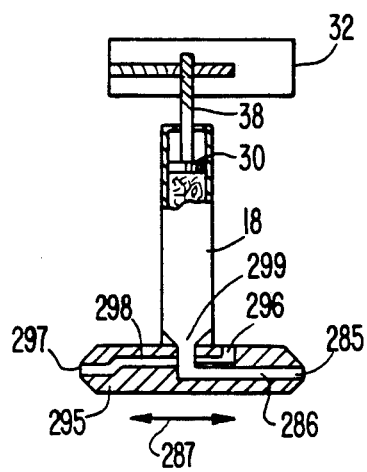
FIG. 7 is a detailed view of the piston, cylinder, and injection nozzle assembly of FIG. 2.

Outlet 285 of nozzle 295 is disposed to mate with inlet 28 of mold cavity 14' when nozzle 295 is moved to the right in FIGS. 6 and 7. Alternatively when nozzle 295 is moved to the left outlet 297 of nozzle 295 mates with inlet 28 of mold cavity 14.

Any conventional means for moving nozzle 295 in the directions indicated by arrows 287 may be used. For instance, by way of example and not limitation, a pnuematic actuator may be employed. Whatever means for moving nozzle 295 is employed that means is operably connected to PLC 81 via lead line 309. PLC 81 generates signals and transmits the signals across lead line 309 to the means for moving nozzle 295 to thereby instruct nozzle 295 as to which mold cavity 14 or 14' is to be injected with moldable material.

Preferably, PLC 81 is programmed to control via lead line 308 the linear actuators connected to the lever arms extending from upper mold pieces 216 and 316 such that mold cavities 14 and 14' are alternately opened and closed to allow moldable material to be injected into the closed mold cavity while the open mold cavity is accessed by an operator to retract the molded object. In this manner, the overall efficiency of the molding process is increased since only one reservoir and means for injecting moldable material may be utilized with more than one mold cavity.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. An apparatus for forming objects from a moldable material, comprising:
   a lower mold piece including a lower half of a mold cavity;
   an upper mold piece including an upper half of the mold cavity, said upper mold piece being pivotably connected to said lower mold piece at a first pivot point;
   a lever arm having a proximal end and a distal end, said distal end extending outwardly from said upper mold piece;
   actuator means, pivotably connected to said distal end of said lever arm at a second pivot point, for pivoting said lever arm and said upper mold piece about said first pivot point to move said upper mold piece and said upper mold cavity half in an arcuate path between a closed position, in which said upper and lower mold pieces and said upper and lower mold cavity halves are juxtaposed to close the mold cavity, and an open position in which said upper and lower mold cavity halves are spaced from one another to open the mold cavity;
   said proximal end of said lever arm being pivotally connected to said upper mold piece at a third pivot point; and
   spring means for biasing said lever arm toward said upper mold piece about said third pivot point and for accommodating over-travel of said actuator means.

2. The apparatus of claim 1, wherein said actuator means comprises a linearly movable drive rod having a distal end pivotably connected to the distal end of the lever arm at said second pivot point, and means for reciprocating said drive rod to pivot the lever arm, upper mold piece, and upper mold cavity half about said first pivot point.

3. The apparatus of claim 2, wherein the drive rod is mounted for pivotable movement about a fourth pivot point.

4. The apparatus of claim 2, wherein the means for reciprocating the drive rod comprises an electric motor operably connected to said drive rod.

5. The apparatus of claim 1, including locking and resisting means, movable between a locked position and an open position, for applying a locking force to hold said upper and lower mold pieces closed when moved to said locked position, and for resisting a separation force applied by the pressure of moldable material in the cavity tending to urge said upper and lower mold pieces open, the maximum value of said locking force being substantially less than the maximum value of said separation force.

6. The apparatus of claim 5, wherein the locking and resisting means comprises at least one toggle clamp.

7. The apparatus of claim 6, wherein each said toggle clamp is pivotable between a first position in which said toggle clamp locks the upper and lower mold pieces together to close the mold cavity, and a second position in which said toggle clamp is retracted and the upper and lower mold pieces can be pivoted about said first pivot point.

8. The apparatus of claim 7, including means for pivoting the toggle clamp between its first a second positions.

9. The apparatus of claim 8, wherein the pivoting means comprises a pnuematic actuator.

10. The apparatus of claim 9, including proximity switch means for detecting when the upper and lower mold pieces are juxtaposed and the mold cavity is closed.

11. The apparatus of claim 10, wherein said means for pivoting the toggle clamp is operable to receive a signal from said proximity switch means to actuate said toggle clamp pivot means.

12. An apparatus for forming objects from a moldable material, comprising:
   a lower mold piece including a lower half of a mold cavity;
   an upper mold piece including an upper half of the mold cavity, said upper mold piece being pivotally connected to said lower mold piece at a first pivot point;
   a lever arm having a proximal end and a distal end, said distal end extending outwardly from said upper mold piece;
   actuator means, having a drive rod pivotably connected to said distal end of said lever arm at a second pivot point, for pivoting said lever arm and said upper mold piece about said first pivot point to move said upper mold piece and said upper mold cavity half in an arcuate path between a closed position, in which said upper and lower mold pieces and said upper and lower mold cavity halves are juxtaposed to close the mold cavity, and an open position in which said upper and lower mold cavity halves are spaced from one another to open the mold cavity;
   said proximal end of said lever arm being pivotably connected to said upper mold piece at a third pivot point;
   spring means for biasing said lever arm toward said upper mold piece about said third pivot point; and
   limit switch means, disposed between said lever arm and said upper mold piece, for detecting a predetermined amount of angular movement of said lever arm about said third pivot point, said predetermined amount of angular movement being against the bias of said spring means and corresponding to over-travel of said drive rod, and means for stopping movement of said drive rod upon detecting said predetermined amount of angular movement.

* * * * *